Dec. 17, 1929.

H. SCHARF

Re. 17,533

SOUND REPRODUCER

Original Filed Oct. 27, 1923

INVENTOR
Hans Scharf

By

H. R. Van Deventer
ATTORNEY.

Reissued Dec. 17, 1929 Re. 17,533

UNITED STATES PATENT OFFICE

HANS SCHARF, OF BERLIN, GERMANY, ASSIGNOR, BY MESNE ASSIGNMENTS, TO BRANDES PRODUCTS CORPORATION, OF NEWARK, NEW JERSEY, A CORPORATION OF NEW JERSEY

SOUND REPRODUCER

Original No. 1,540,229, dated June 2, 1925, Serial No. 671,148, filed October 27, 1923. Application for reissue filed July 6, 1926. Serial No. 120,840.

This invention relates to sound reproducers and more particularly to diaphragm mountings for telephone receivers, loud speakers and the like.

In devices of this character the diaphragm is usually disc shaped and is held around its periphery. A drawback of such devices is that not the entire surface of the diaphragm is exposed to the air. Furthermore, during its movement the diaphragm produces objectionable noises because it is rigidly held around its periphery.

In accordance with the present invention these drawbacks are avoided by holding the diaphragm around its periphery in a manner that the diaphragm contacts only with some soft material preferably rubber and that the whole surface of the diaphragm is exposed to the air. The diaphragm provided in accordance with the present invention moves practically freely in the air and substantially parallel with its normal position. This will result in improving the quality and quantity of the reproduced sound.

The soft material e.g. rubber, used for holding the diaphragm is preferably stretched over the whole surface of the diaphragm or it may be solidly connected therewith around its periphery. Due to the provision of such rubber pad the vibration of the diaphragm will be materially damped. Preferably, the diaphragm is cone-shaped whereby the surface of the diaphragm is increased notwithstanding the fact that the cross section of the holding arrangement remains the same. One of the advantages of the diaphragm forming the object of the present invention consists in that due to the provision of the soft material used for clamping the diaphragm the latter makes no contact with metal.

Furthermore, by extending the rubber material beyond the edge of the diaphragm and using it as the sole means for mounting the diaphragm in a support, the edges of the diaphragm are permitted a free range of movement under the impulses of the vibrations communicated thereto. By this means the distortions are eliminated that occur in diaphragms tightly clamped at the edges thereof to the mounting member or support. Such an arrangement is particularly advantageous when applied to loud speakers capable of propagating sound waves directly in free air.

Figure 1:
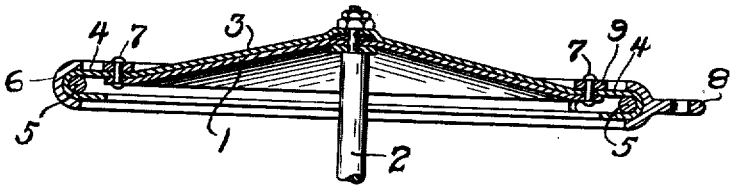
Figure 2:
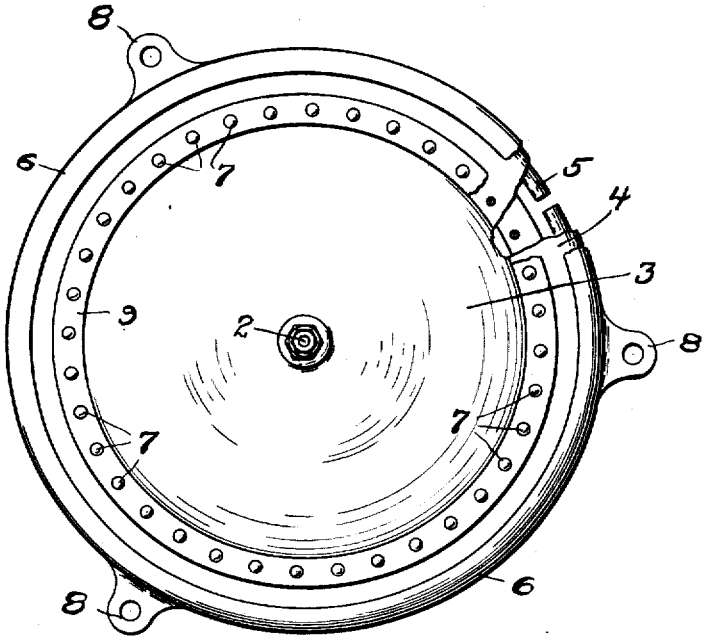

The drawings show a diaphragm constructed in accordance with the present invention, Fig. 1 being a sectional view, and Fig. 2 a top plan view.

In the arrangement shown in the drawings a diaphragm 1 is made of cone-shaped sheet of rigid material which in any well known manner, e. g. through the agency of a rod 2, is caused to vibrate. The metallic cone is entirely covered with a piece of flat rubber 3 which projects beyond the periphery of the diaphragm. The projecting rubber rim 4 is wrapped around a ring 5 of resilient material and is forced therewith into a suitably shaped frame 6. The diaphragm 1 is attached to the rubber cover 3 by means of a plurality of small rivets 7 and a relatively inflexible ring member 9 provided around its periphery for reinforcing the peripheral edge. The frame 6 is provided with projections 8 by means of which it may be attached to a table or panel. It will be seen from the drawings that the diaphragm 1 is nowhere in contact with metal, that it moves substantially parallel to its normal position, and that substantially the entire surface of the diaphragm is exposed to the air. The rubber coating will entirely eliminate the natural vibrations of the diaphragms.

Obviously, certain features of the invention may be practised with a flat diaphragm as well as a cone-shaped diaphragm. Instead of using rubber for covering the diaphragm some other soft substance may be used. Furthermore, two cone-shaped diaphragms like the one shown in the drawings may be combined into a double cone. These and other modifications as well as various applications of the invention to commercial structures will readily suggest themselves to those skilled in the art.

I claim:—

1. A sound reproducer comprising a vibratory diaphragm, a sheet of resilient material engaging and extending over one face of the diaphragm and beyond the periphery thereof, and a support encircling the diaphragm and of greater size than the diaphragm, said sheet adjacent its periphery being secured to said support.

2. A sound reproducer comprising a vibratory diaphragm, a sheet of resilient material engaging and extending over one face of the diaphragm, said sheet being affixed to the diaphragm adjacent the periphery of the diaphragm and extending beyond said periphery, and a support encircling the diaphragm and of greater size than said diaphragm, and means for engaging the sheet adjacent its periphery for affixing it to said support.

3. A sound reproducer comprising a vibratory diaphragm, a sheet of resilient material engaging and extending over one face of said diaphragm, a clamping ring securing the sheet to the diaphragm adjacent the periphery of the latter, said sheet projecting beyond said periphery, a support of greater size than the diaphragm and encircling the latter, said support having an annular recess and a fastening ring to press the periphery of the sheet into said recess to mount the diaphragm with the sheet upon said support.

4. In a sound reproducing device, the combination with a diaphragm of sufficient area to reproduce self-sustaining sound waves in free air and means for vibrating said diaphragm, of a support, a flexible ring of material fastened to said diaphragm about the periphery thereof and to said support and a reinforcing member encircling the periphery of said diaphragm and connected to said flexible ring of material.

5. In a sound reproducing device, the combination with a diaphragm of sufficient area to reproduce self-sustaining sound waves in free air and means for vibrating said diaphragm, stiffening means for reinforcing the edge of said diaphragm of a support for said diaphragm and a flexible ring of material for mounting said diaphragm in said support so that the whole diaphragm is free to move as a unit under the impulses of the vibrations communicated thereto.

6. In a sound reproducing device, the combination with a diaphragm, of means secured to said diaphragm for vibrating the same, a support, flexible means fastened to the peripheral edge of said diaphragm and connected to said support for mounting the same in said support.

7. A sound reproducing device having, in combination, a relatively inflexible formed diaphragm of sufficient area to reproduce self-sustaining sound waves in free air, a relatively inflexible member secured about the periphery thereof, a support for said diaphragm and flexible means secured to said diaphragm for mounting the same in said support, and means for vibrating said diaphragm.

8. In a sound reproducing device, the combination with a diaphragm of conical shape of sufficient area to reproduce self-sustaining sound waves in free air, of means for vibrating said diaphragm, means secured about the periphery of said cone so as to reinforce the same, a rim member and flexible means extending between said rim member and said last mentioned means for maintaining said diaphragm in position for actuation by said second mentioned means.

9. In a sound reproducing device, the combination with a diaphragm of conical shape of sufficient area to reproduce self-sustaining sound waves in free air and means for vibrating said diaphragms, of a support, flexible means secured to said diaphragm and constituting the mounting therefor in said support, and means secured about the periphery of said cone so as to reinforce the same, said flexible means being interposed between the cone and the reinforcing means.

In testimony whereof, I affix my signature.

DR. HANS SCHARF.

DISCLAIMER

Re. No. 17,533.—*Hans Scharf*, Berlin, Germany. SOUND REPRODUCER. Patent dated December 17, 1929. Disclaimer filed April 15, 1932, by the assignee, *Brandes Products Corporation*.

Hereby enters this disclaimer to that part of the claims in the specification which is in the following words, to wit:

1. Your petitioner hereby disclaims the subject matter of claim 6 except combinations in which the diaphragm is of large area for a loud speaker, and there is stiffening means for reinforcing the edge of said diaphragm.

2. Your petitioner hereby disclaims the subject matter of claims 4, 5, 7, 8, and 9 except combinations in which the diaphragm is of large area for a loud speaker.

[*Official Gazette May 10, 1932.*]